May 9, 1944.   F. S. DUNLEAVEY   2,348,284
ELECTROLYTIC CAPACITOR
Filed Aug. 14, 1939
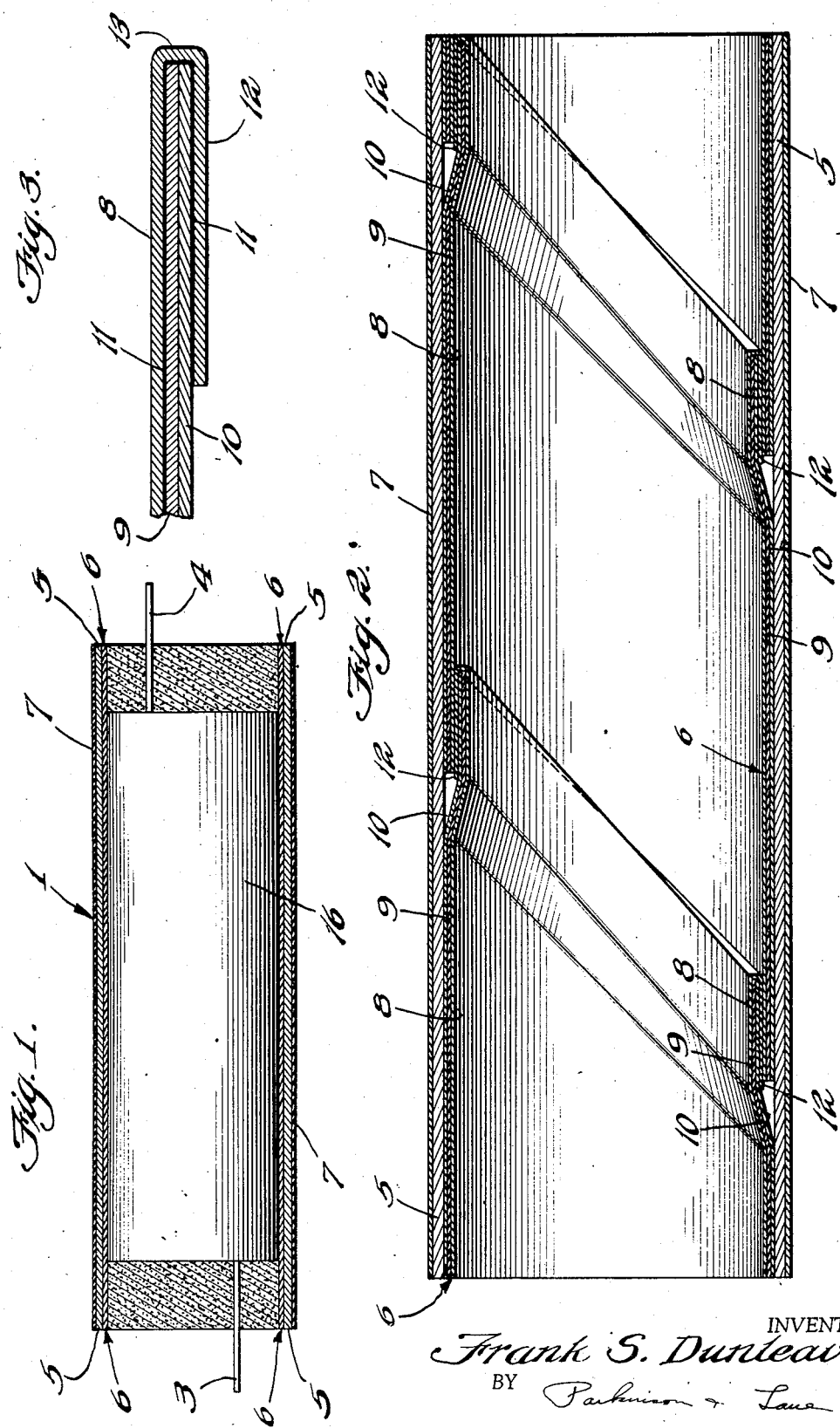
INVENTOR.
Frank S. Dunleavey
BY Parkinson + Lane
ATTORNEY.

Patented May 9, 1944

2,348,284

UNITED STATES PATENT OFFICE 2,348,284

ELECTROLYTIC CAPACITOR

Frank S. Dunleavey, Fort Wayne, Ind., assignor, by mesne assignments, to The Magnavox Company, Fort Wayne, Ind., a corporation of Delaware Application August 14, 1939, Serial No. 290,004

7 Claims. (Cl. 138—78)

The present invention relates to electrolytic capacitors or condensers and more particularly to a novel tube or container therefor and in the novel means and method of forming or fabricating such tube or container for housing the capacitor rolls of a dry electrolytic capacitor.

One serious objection to the prior commercial types of paper tube or case is that the ionic conduction of free inorganic ions has been sufficient to cause corrosive effects on the capacitor roll, and the vapor and liquid phases of the electrolyte provide leakage paths through the tube such that the insulating value of the tube wall is not sufficient to give trouble-free service of the electrical device on which it is employed. These dissociated ions in the tube wall are free to move to the anode or cathode and react with the electrode material, with the degree of attack dependent upon the ionic conductivity and degree of impermeability of the tube. This dangerous ionic conductivity and its corrosive effect upon the electrodes and tabs is such as to materially reduce the life of the capacitor.

Another serious objection has been that in the prior types of paper tubes or containers for electrolytic capacitors considerable difficulty has been experienced in that the adhesive used to seal the lapped edges has been water soluble, and consequently these seams are readily opened by sources of water or other solvent vapors or liquids from the interior or exterior of the tube. Thus the permeability of the tube to the passage of vapor or liquid phases of the electrolyte used in dry electrolytic capacitor rolls is considerably increased and the loss of these liquid or vapor phases under service conditions through the tube wall or otherwise, greatly shortens the capacitor's life.

A still further objection to these prior types of paper tubes has been the cost of manufacture in that in an endeavor to provide an additional barrier or obstacle against the liquid and vapor phases of the electrolyte escaping from the unit, an inner seal or wrapper around the roll has been provided, and the ends of this wrapper were of necessity sealed with wax. This additional wrapper and pouring necessitated additional operations and material due to an inherent deficiency in the prior tubes, but even so, the service life of the capacitors so cased has been relatively short.

It is, therefore, an object of the present invention to provide a tube or case for an electrolytic condenser in which the ionic conduction or migration of any inorganic ions is prevented or reduced to a minimum, thereby greatly prolonging the life of the capacitor and giving optimum efficiency and performance.

A further object is the provision of a novel type of container in which permeability of the tube to the passage of vapor or liquid phases of the electrolyte is greatly decreased and consequently the loss of these phases under actual operating or service conditions is prevented or materially reduced.

Another object of the present invention is to provide a novel inner liner for a tube or container for an electrolytic condenser, so constructed or fabricated and arranged as to form a continuous laminated lining forming a barrier against the migration of any inorganic ions which would produce corrosive effects on the electrolytic capacitor. In its preferred form, the invention comprehends fabricating the liner of laminations of cellulose acetate film, aluminum foil and bond paper suitably affixed, with the cellulose acetate film and metal foil secured by a thermoplastic adhesive to which has been added chemically inert carbon black which increases the viscosity of the adhesive and the thickness of the adhering coat, and the carbon particles serving to break up the paths of the free ions so as to materially increase their length of path and reduce their migration and conductivity. The thermoplastic adhesive loaded with carbon black clogs the minute openings in the cellulose acetate film and in addition to the reduction of the ionic conduction of such tubes, materially reduces the moisture permeability rate.

Further objects, advantages and capabilities will be apparent from the description or disclosure in the drawing, or are inherent in the device.

In the drawing:

Fig. 1 is a view in horizontal cross section through an electrolytic capacitor employing the novel tube or container structure.

Fig. 2 is an enlarged view in horizontal cross section through the tube or container.

Fig. 3 is a fragmentary view in horizontal cross section of a further enlargement showing the details of the inner liner.

Referring more particularly to the disclosure in the drawing and the embodiment selected to illustrate the invention, the electrolytic condenser comprises a tube or container 1 housing or enclosing a conventional capacitor roll having tabs and leads 3 and 4 extending to the exterior.

The disclosed embodiment of tube or container comprises a tubular member or main body portion 5 formed of spirally wound layers or plies of paper, preferably a good grade of kraft paper with the seams of the several convolutions adhesively secured together in a manner that the seams are out of alignment or register. The body portion is of sufficient thickness and construction to provide a permanent casing and give the tube the rigidity required, and further serves as a supporting means or base for the inner liner 6. Any suitable or conventional water soluble adhesive may be used in forming this body portion. The outer ply 7 of this tubular member or body portion 5 is preferably a finish paper upon which can be printed the electrical rating of the device and other suitable identification or decoration as may be deemed necessary or desirable.

In the preferred form shown, the inner lining 6 consists of three plies of material arranged in a novel manner to secure a moisture-proof and vapor-proof barrier having high impermeability to the migration of ions. This inner liner is more clearly shown in Figures 2 and 3 wherein the plies comprise a sheet or film of cellulose acetate or any other suitable cellulose derivative 8, laminated to a metal foil 9, the latter being secured to a sheet or lamina of bond paper 10 by means of a suitable adhesive. In laminating the foil to the bond paper excellent results have been secured by the use of a casein latex or a reasonably neutral cement or adhesive of the casein latex type. In laminating the cellulose acetate to foil-paper combination, excellent results have been secured by the use of a thermoplastic resin type, black-pigmented adhesive. These three layers or laminae provide a liquid-proof and vapor-proof lining against the penetration of electrolyte liquid or vapors through the tube wall, and reduce the ionic conductivity to a minimum.

In the fabrication of the liner, I have secured excellent results by laminating a metal foil 9 such as aluminum of approximately .0003 to .0005 inch thickness, to a bond paper 10 of suitable weight. This is accomplished by means of a suitable casein latex adhesive well known in the art of laminating paper to aluminum or other metal foils. The cellulose acetate film or sheet 8 is then secured to the face of the aluminum foil 9 by means of a thermoplastic cement or adhesive 11 to which has been added chemically inert carbon black. I have secured excellent results by using a lacquer type of thermoplastic. This cellulose acetate film or sheet is of sufficient width as to overhang the foil-paper laminae so that the margin portion 12 of this sheet may be reversely folded over at 13 onto the bond paper 10 and thereby make a tight seal.

In the process of fabricating the tube, the inner lining material is laid film face down on a winding mandrel and the next ply or coil of the lining material is lapped over and engages the reversely turned portion of the first piece or coil as illustrated in Fig. 2. The edges of the laminated lining 6 are bonded by an adhesive or suitable solvent such as acetone or other solvents adaptable to cellulose derivatives. By thus bonding or seaming the adjacent plies or convolutions of paper 10, foil 9 and cellulose acetate 8 together, a continuous cemented structure is produced, resulting in a substantially complete and impenetrable barrier against the migration of any inorganic ions which would produce corrosive effects on the electrolytic capacitor. By loading this thermoplastic adhesive or cement 11 with carbon black, ionic conductivity is greatly minimized, and by coating the entire inner surface of the liner with such adhesive, excellent results both as to prevention of ionic conductivity and liquid and vapor-proofness are secured. The tube is sealed on the ends with a suitable potting compound which closes the ends and seals the capacitor roll 16 and the assembly of the tabs to the lead wires.

Although the disclosure has been directed more particularly to condensers or capacitors, it will be evident to those skilled in the art that the invention is applicable to other uses and constructions such as electrical components including resistors, inductors, etc.

Having thus disclosed the invention, I claim:

1. A tubular article for enclosing an electrolytic capacitor comprising an outer strengthening layer, and having an inner liner comprising three layers of material one of said layers being composed of a cellulose derivative, another layer being composed of metal foil and a third layer composed of paper, and an adhesive located between said cellulose derivative and said metal foil layers.

2. A tubular article for enclosing an electrolytic capacitor comprising an outer strengthening layer, and having an inner liner comprising three layers of material one of said layers being composed of cellulose acetate, another layer being composed of metal foil and a third layer composed of paper, and an adhesive located between said cellulose acetate and said metal foil layers.

3. A tubular article for enclosing an electrolytic capacitor comprising an outer strengthening layer, and having an inner liner comprising three layers of material, one of said layers being composed of a cellulose derivative, another layer being composed of metal foil and a third layer composed of paper, and an adhesive located between said cellulose derivative and said metal foil layers, said adhesive containing carbon black particles.

4. A tubular article for enclosing an electrolytic capacitor comprising an outer strengthening layer, and having an inner liner comprising three layers of material one of said layers being composed of a cellulose derivative, another layer being composed of metal foil and a third layer composed of paper, and an adhesive located between said cellulose derivative and said metal foil layers, said adhesive containing chemically inert conducting particles.

5. A casing or housing for enclosing an electrolytic capacitor comprising an outer strengthening layer, and having an inner liner, comprising a plurality of layers of material one of said layers being composed of a cellulose derivative, another layer being composed of metal foil and a third layer composed of paper, and an adhesive located between said cellulose derivative and said metal foil layers, said adhesive containing carbon black particles.

6. A casing or housing for enclosing an electrolytic capacitor comprising an outer strengthening layer, and having an inner liner comprising a plurality of layers of material one of said layers being composed of a cellulose derivative, another layer being composed of metal foil and a third layer composed of paper, and an adhesive located between said cellulose derivative and said metal foil layers, said adhesive containing chemically inert conducting particles.

7. As an article of manufacture, a container comprising a rigid outer supporting tube and a liner comprising a paper backing member, a vapor-proof metal foil laminated to said backing member, a substantially inert liquid-proof film and an adhesive adhering said film to said foil, said adhesive containing chemically inert particles.

FRANK S. DUNLEAVEY.